United States Patent [19]

Kishimoto

[11] Patent Number: 4,460,928

[45] Date of Patent: Jul. 17, 1984

[54] ELECTRONIC APPARATUS FOR VOICE OUTPUT OF STORED INFORMATION

[75] Inventor: Juji Kishimoto, Yokohama, Japan

[73] Assignee: Canon Kabushiki Kaisha, Tokyo, Japan

[21] Appl. No.: 438,225

[22] Filed: Nov. 1, 1982

Related U.S. Application Data

[63] Continuation of Ser. No. 185,947, Sep. 10, 1980, abandoned.

[30] Foreign Application Priority Data

Sep. 20, 1979 [JP]  Japan ................................. 54-121501

[51] Int. Cl.³ .............................................. G11B 5/00
[52] U.S. Cl. .......................................... 360/4; 360/12
[58] Field of Search ............................ 360/4, 12, 72.2

[56] References Cited

U.S. PATENT DOCUMENTS

| | | | |
|---|---|---|---|
| 3,999,050 | 12/1976 | Pitroda | 364/419 |
| 4,097,905 | 6/1978 | Kramer | 360/12 |
| 4,117,542 | 9/1978 | Klausner et al. | 364/900 |
| 4,159,490 | 6/1979 | Wood | 360/12 |
| 4,228,470 | 10/1980 | Rahamin et al. | 360/12 |

Primary Examiner—Vincent P. Canney
Attorney, Agent, or Firm—Fitzpatrick, Cella, Harper & Scinto

[57] ABSTRACT

Electronic apparatus for voice output of stored information includes input keys for entering information into the apparatus, a microphone for receiving voice messages, a first memory for storing the information, a second memory for storing signals representative of the voice messages, and a memory control for causing the first memory to store the information and causing the second memory to store a signal representative of a voice message which is entered from the microphone to be associated with the information stored in the first memory.

18 Claims, 6 Drawing Figures

ELECTRONIC APPARATUS FOR VOICE OUTPUT OF STORED INFORMATION

This is a continuation of application Ser. No. 185,947, filed Sept. 10, 1980, now abandoned.

BACKGROUND OF THE INVENTION

1. Field of the Invention

The present invention relates to an electronic apparatus capable of providing voice output of the information for example of appointments at predetermined times.

2. Description of the Prior Art

As already known some clocks and watches as well as electronic calculators with clock function have the function of informing time or lapse of time by sounding a buzzer or a chime at preselected times.

However such a buzzer or chime only informs the time or lapse of time itself and not what is meant by that time or what to do at that time.

It is however often difficult for people keeping a busy schedule to recall what is intended at each predetermined time, and particularly it is difficult to remember the appointments made weeks or months in advance without referring to the memorandum or agenda recording such appointments.

SUMMARY OF THE INVENTION

The present invention is to avoid such difficulty, and a principal object thereof is to provide an electronic apparatus capable of providing, at preselected times, voice announcement of the information associated with such times.

Another object of the present invention is to provide an electronic apparatus adapted for storing single data from two input means.

Still another object of the present invention is to provide an electronic apparatus capable of storing information entered in voice through a microphone under and in connection with data entered from keyboard input means.

Still another object of the present invention is to provide an electronic apparatus capable of storing information entered in voice through a microphone under and in connection with data entered from keyboard input means, and retrieving the data to retrieve and produce the information entered in voice.

DESCRIPTION OF THE PREFERRED EMBODIMENTS

Now the present invention will much more be clarified in detail by the following description of an embodiment thereof with reference to the accompanying drawings.

Figure 1:
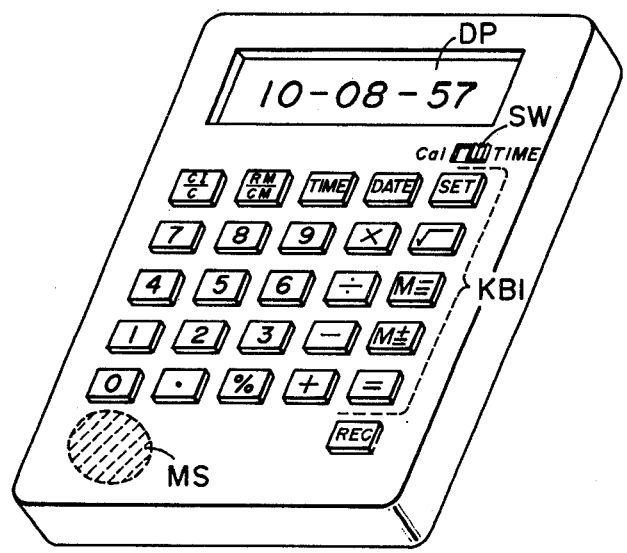
FIG. 1 is an external perspective view of an embodiment of the present invention.

FIG. 1 shows an embodiment of the present invention in an external view, wherein there are shown:

a key group KB1 for entering time information and calculational information and comprising numeral keys "1"–"0", arithmetic operation keys "+", "−", "×" and "÷", an execution key "=", a data input key DATE, a time input key TIME, a time set key SET, etc.;

a recording key REC for voice recording which is turned on upon an actuation and turned off upon a further actuation;

a microphone MS; and a switch SW for selecting a calculation mode or recording mode.

Figure 2:
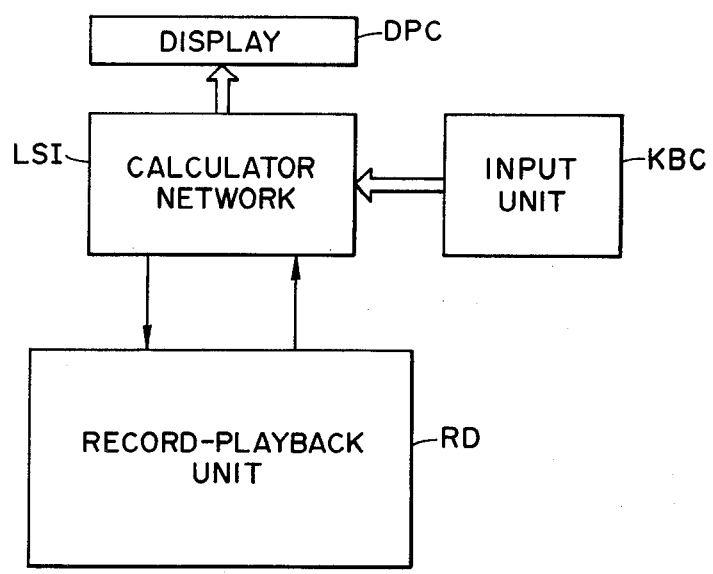
FIG. 2 is a schematic block diagram of the embodiment shown in FIG. 1.
Figure 3:
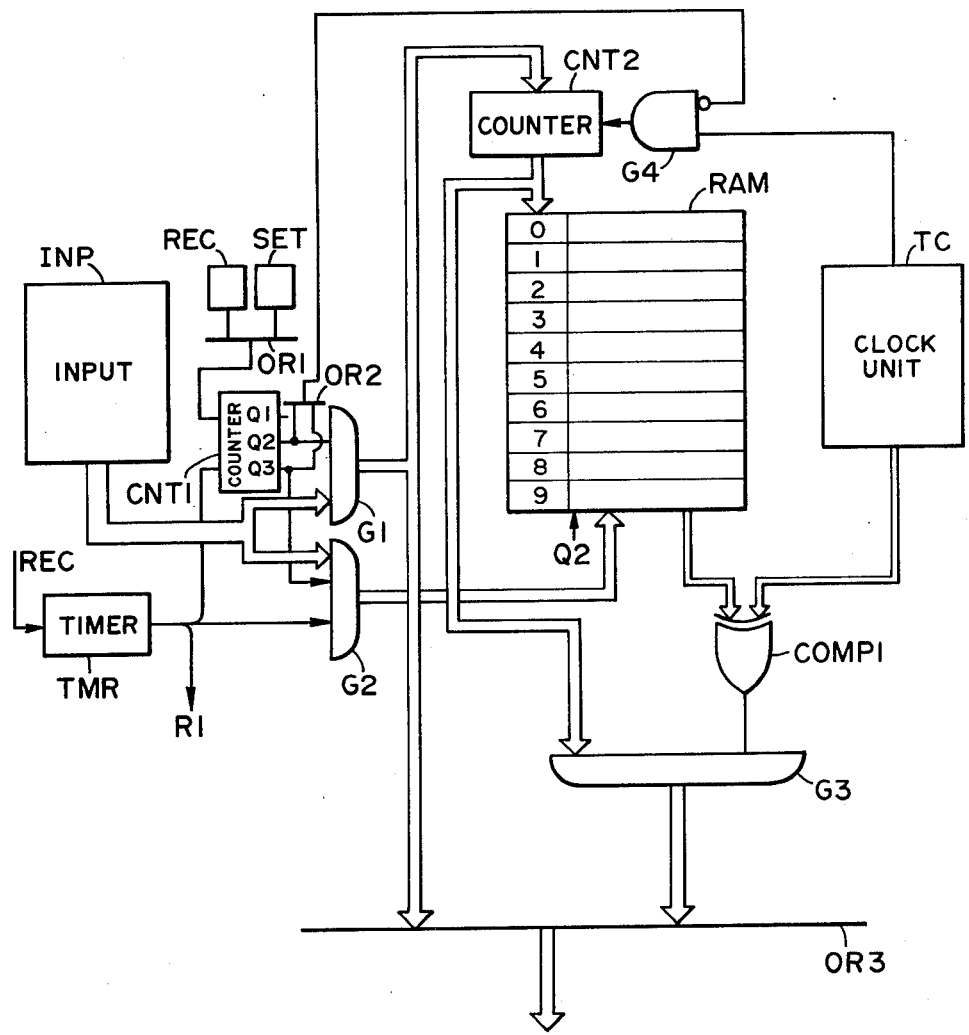
FIG. 3 is a schematic block of the principal part of the calculator network shown in FIG. 2.

FIG. 2 is a block diagram of the embodiment shown in FIG. 1, wherein there are shown an input unit KBC for generating signals in response to an actuation of the keys and switch, and a calculator network LSI provided with known arithmetic functions, a known clock function and an alarm function for giving an alarm at predetermined times. Now referring to FIG. 3 showing the alarm circuit in a detailed block diagram, there are shown:

an input circuit INP having memory;

a recording key REC shown in FIG. 1;

a time set key SET;

a counter CNT1 adapted to be incremented from its initial state to the states "1" and "2" in response to an actuation of the recording key REC and the time set key SET to cause high-level signals to be developed on the output ports Q2 and Q3 and a high-level signal to be developed on the output port Q1 upon receipt of a signal from a timer to be explained later;

a counter CNT2 used for addressing the memory and having a count corresponding to an address in the memory;

a random access memory RAM having in the illustrated case addresses 0–9 to be selected by the counter CNT2 and being placed in the write-in or read-out mode respectively at the high- or low-level of the output Q2 of the counter CNT1;

a clock unit TC for time information and clock pulses for incrementing the counter CNT2;

a comparator COMP1 for comparing the content read out from the memory RAM with the time information supplied from clock unit TC to produce a high-level signal when mutual coincidence occurs;

a timer TMR to be started by recording key REC for resetting the counter CNT1 after the lapse of a determined time;

an AND gate G1 for controlling the date entry from the input circuit INP;

an AND gate G3 for controlling the transfer of the content of the counter CNT2;

an AND gate G4 for controlling the transfer of the clock pulses from the clock circuit TC to the counter CNT2; and OR gates OR1–OR3.

Figure 4:
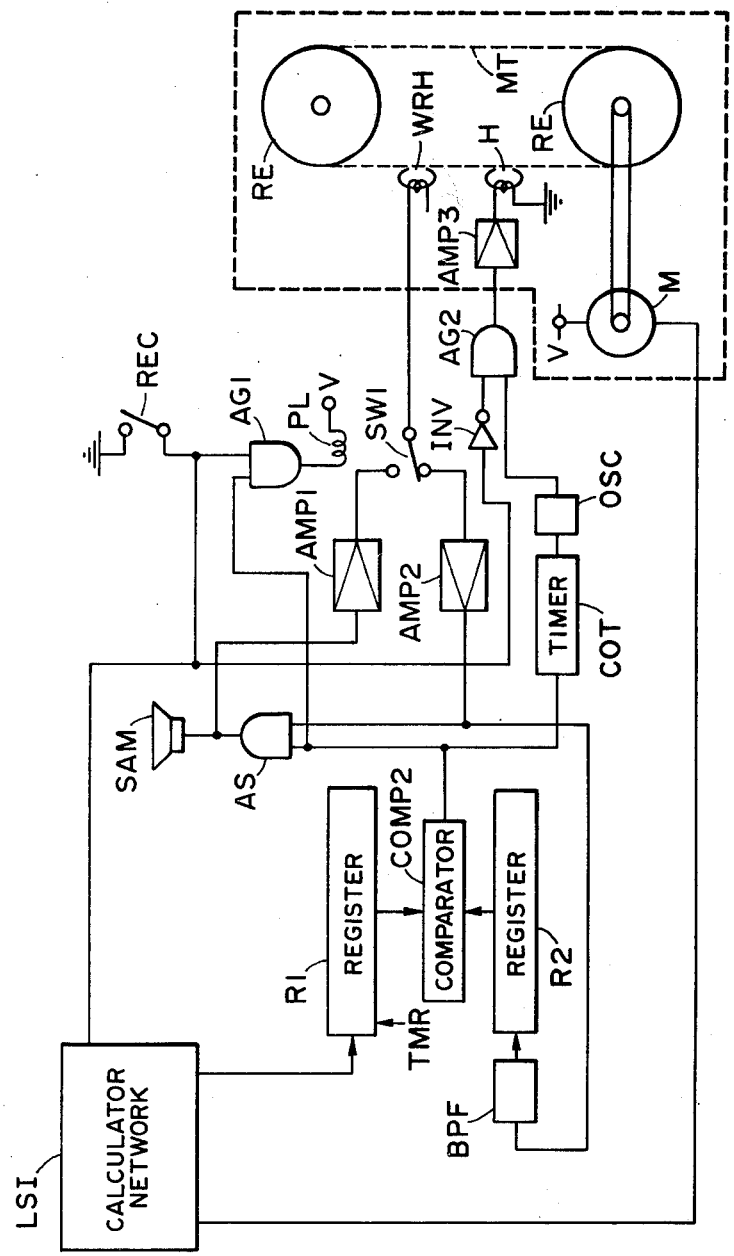
FIG. 4 is a schematic block diagram of the record-playback unit.

In FIG. 2 there is also shown a record-playback unit RD, which, as detailedly shown in the block diagram of FIG. 4, is provided with:

a register R1 for storing the address signals supplied from the calculator network LSI;

a register R2 for storing the address signals recorded on a magnetic tape constituting a recording medium;

a comparator COMP2 for comparing the contents of the registers R1 and R2 to produce a coincidence signal upon mutual coincidence occurring;

a speaker-and-microphone SAM to be controlled in response to the output of the comparator COMP2;

a plunger winding PL for actuating a switch SW1 to connect a readout amplifier or a write-in amplifier with a magnetic head WRH;

a magnetic head WRH for writing information into and reading it from a magnetic tape MT constituting the recording medium;

a magnetic head H for erasing the information recorded on the magnetic tape;

a magnetic tape MT on which information is to be recorded or read by magnetic head WRH and erased by magnetic head H, the tape being divided into ten sections each of which contains, in succession, a prerecorded leading 2 kHz signal indicating a logical "0", an address signal 0–9 specifying the address of the section, a record start signal, and a length, e.g. 10 seconds, of message to be recorded representative of a scheduled appointment;

a motor M for driving reels RE1 and RE2 in one direction;

a timer COT to be enabled in response to coincidence signals from the comparator COMP for activating an oscillator OSC for a determined period;

an oscillator OSC for generating an erasing signal to be supplied to the magnetic head H;

a gate AG1 receiving signals from the recording button REC and the comparator COMP2 to supply an output signal to plunger winding PL;

an inverter INV for transmitting the output signal from the recording button REC to the gate after inversion;

a gate AG2 controlled by inverter INV to transmit the output signal from the oscillator OSC to the magnetic head H through an amplifier AMP3;

an analog switch AS to transmit the output signal from an amplifier AMP2 to the speaker-microphone SAM in response to the output from the comparator COMP2; and amplifiers AMP1–AMP3.

In FIG. 2 there is also shown a display circuit DPC.

In operation of arithmetic calculations with the above-explained apparatus, the switch SW is set at the "Cal" side, and the calculator network LSI executes the required calculation in response to actuations of numeral keys "1"–"0", operation keys "×", "÷", "+" and "−" and execution key "=", to display the entered numbers and the result of calculation on the display unit DP.

Now there will be explained and exemplary case of memorizing an appointment "Call Mr. Kinoshita at 10:30".

At first the switch SW is set at the "Time" mode, and a memory address is entered for storing the message. In the illustrated embodiment there are provided ten addresses which are selectable by the numeral keys. In case storing the message into the address "0", the numeral key "0" is actuated to enter a number "0" into a buffer memory of the input unit INP. Then, upon actuation of the recording button REC, the counter CNT1 is incremented from its initial state by one to enable the AND gate G1, thereby setting the number "0" stored in input unit INP into the counter CNT2. Also the number "0" is stored through an OR gate OR3 in the register R1 shown in FIG. 4. Comparator COMP2 compares the number "0" stored in the register R1 with the content of the register R2, which receives the address signal from the magnetic tape MT through the magnetic head WRH, switch SW1, amplifier AMP2 and a bandpass filter BPF.

Subsequently the scheduled time is entered in response to the keys "1", "0", "TIME", "3", "0" and "SET" operated in sequence.

In response to the actuation of the key SET, the counter CNT1 is incremented again to disable the AND gate G1 and to enable the AND gate G2, whereby the time data for 10:30 entered in the input unit INP are stored in the address 0, selected by the counter CNT2, of the memory RAM.

Figure 5:
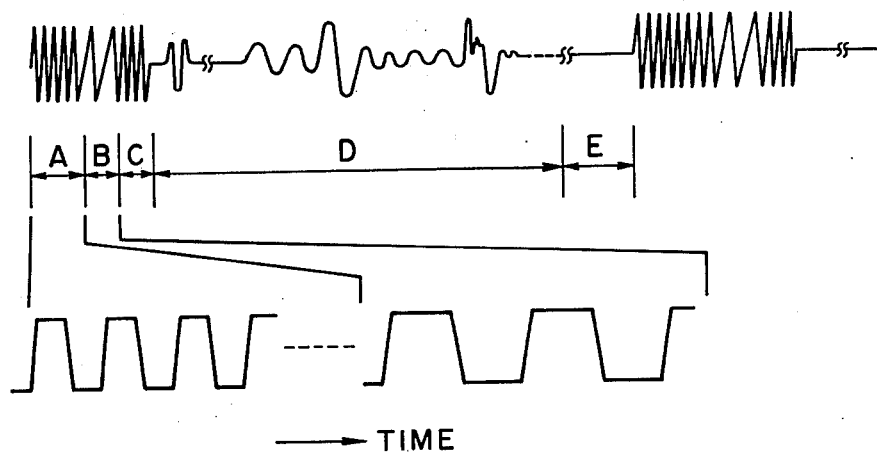
FIG. 5 shows signal waveforms.

Then the magnetic tape MT is run, and, upon arrival of an address signal B shown in FIG. 5 and pointing the address 0, the content of the register R2 coincides with that of the register R1 to open the analog switch AS, whereby the record start signal prerecorded on the magnetic tape MT as the signal C shown in FIG. 5 is given through the speaker-microphone SAM. Then in response to the output signal from the AND gate G1 enabled by the signals from the recording button REC and the comparator COMP2, the plunger winding PL is changed over to connect the amplifier AMP1 to the magnetic head WRH. In this state sound information "Call Mr. Kinoshita" is recorded, through speaker-microphone SAM, in the address 0 of the magnetic tape MT. The recording button REC is turned off upon subsequent reactuation thereof.

After the lapse of a determined time the timer TMR produces a signal to reset the counter CNT1 to its initial state and to clear the register R2 thereby completing the information storage. Thus the AND gate G4 is enabled whereby the content of the counter CNT1 is incremented every minute by the clock unit TC. The comparator COMP1 compares the content of the clock unit TC with the content of the memory RAM read in response to the counter CNT2, and, upon arrival of the content of the clock unit TC at the scheduled time of 10:30, produces a coincidence signal to transmit the content of the counter CNT2 to the record-playback unit through the AND gate G3. The address signal thus transmitted is stored in the register R1 and compared by the comparator COMP2 with the address signals supplied in succession from the magnetic tape MT to the register R2 through the magnetic head WRH. Upon coincidence of these address signals the speaker-microphone SAM emits a beep signal recorded on the tape MT followed by the recorded message "Call Mr. Kinoshita". The storage and retrieval of the schedule information are achieved in the above-explained manner.

As explained in the foregoing, the apparatus of the present invention allows the information to be confirmed on the scheduled appointments.

Figure 6:
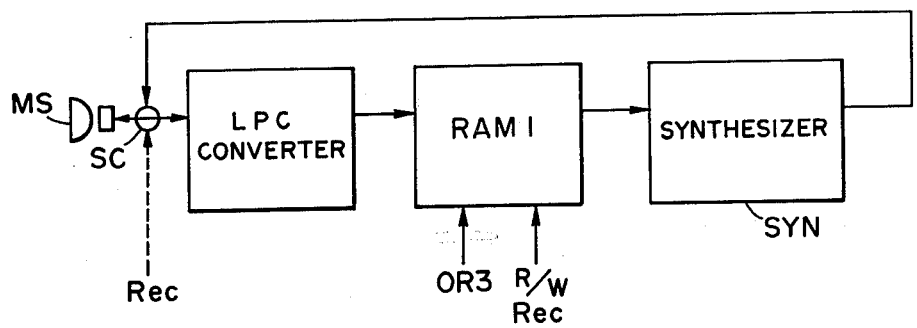
FIG. 6 is a schematic block diagram of another embodiment of the present invention.

FIG. 6 is a block diagram showing another embodiment in which the aforementioned magnetic recording is replaced by recording in semi-conductor devices, wherein a speaker-microphone MS is connected by a switch circuit SC to a converter LPC to function as a microphone when the recording button REC is turned on, and is connected to a synthesizer SYN when recording button REC is turned off.

The converter LPC carries out the signal compression and digitalization of the voice signal.

A memory RAM is provided to store and generate the output signal from converter LPC, respectively when the recording button REC is turned on or off.

The synthesizer SYN converts the signals read out from the memory RAM into audio signals and transmits the same to the speaker-microphone MS through the switch circuit SC.

In the above-explained embodiment, in response to the actuation of the recording button REC and any of the numeral keys "1"–"0", the corresponding number is stored in the counter CNT2 and also supplied as an address signal to the memory RAM through the OR gate OR3. Subsequently the selected time data stored in the memory RAM in the aforementioned manner.

In this state a voice message is given to the speaker-microphone MS of which output signals are supplied through the switch circuit SC to the converter LPC, and the signals thus compressed and coded are stored in the memory RAM.

At the message playback at the selected time, the address signal is given through the OR gate OR3 to the memory RAM which produces the stored, coded signals representative of voice information in succession to the synthesizer, wherein the coded signals are again converted into audio signals and supplied to the speaker-microphone MS.

I claim:

1. An electronic apparatus, comprising:
   input means for selectively entering numerical data for a calculation and scheduled time data;
   calculating means connected to said input means for operating on the numerical data to produce an operational result;
   addressable memory means for storing the scheduled time data entered by said input means;
   message memory means for storing verbal messages corresponding to the scheduled time data, each said verbal message being stored in the form of a digital signal;
   real time clock means for producing an output corresponding to the time of day;
   read-out means for retrieving the scheduled time data stored in said addressable memory means on the basis of the output of said real time clock means and for reading out the digital signal corresponding to the scheduled time data from said message memory means upon coincidence of the output corresponding to the time of day and the scheduled time data; and
   reproducing means for reproducing said verbal message from said digital signal read out by said read-out means.

2. An electronic apparatus according to claim 1, wherein said input means includes a manually operable key switch to enter selectively at a first position the numerical data and at a second position the scheduled time data.

3. An electronic apparatus according to claim 2, wherein said manually operable key switch includes a key having a first position for setting said apparatus in a computation mode and a second position for setting said apparatus in a schedule input mode.

4. An electronic apparatus according to claim 1, further comprising address means connected to said real time clock means and said read-out means for generating address information to read out the scheduled time data stored in said addressable memory means.

5. An electronic apparatus according to claim 1, further comprising a microphone for storing said verbal messages in said message memory means.

6. An electronic apparatus according to claim 5, further comprising switching means for causing said microphone to perform a speaker function.

7. An electronic apparatus according to claim 1, wherein said message memory means includes a random access memory.

8. An electronic apparatus according to claim 7, wherein said reproducing means includes a synthesizer for verbally synthesizing said verbal message.

9. An electronic apparatus according to claim 1, further comprising means for converting a verbal message into a digital verbal signal to store the verbal message in said message memory means.

10. An electronic apparatus, comprising:
    real time clock means for generating an output corresponding to the time of day;
    addressable memory means for storing scheduled time data;
    address means for generating an address to read the scheduled time data out of said addressable memory means;
    message memory means for storing a plurality of specific addresses corresponding to the addresses of said addressable memory means and for storing a plurality of verbal messages each corresponding to respective ones of said specific addresses
    first control means for reading out the scheduled time data from said addressable memory means by accessing said addressable memory means upon coincidence of the output of said real time clock means and the scheduled time data, and for generating the address of said corresponding verbal message upon said coincidence; and
    second control means for reading out a verbal message from said message memory means in accordance with said address generated by said first control means.

11. An electronic apparatus according to claim 10, wherein said address means is connected to said real time clock means and its generated address is renewed by said real time clock means.

12. An electronic apparatus according to claim 10, further comprising a microphone for storing verbal messages in said message memory means.

13. An electronic apparatus according to claim 12, further comprising switching means for causing said microphone to perform a speaker function.

14. An electric apparatus, comprising:
    address generating means for generating address information to indicate a memory location of a scheduled message;
    a memory having a first memory location for storing address information and a second memory location for storing a start signal associated with said first memory location and a scheduled message;
    comparator means for comparing the address information generated by said address generating means with the address information stored in the first memory location of said memory and for producing a coincidence signal upon a coincidence thereof;
    reproducing means for reproducing the start signal stored in said second memory location in response to the coincidence signal from said comparator means;
    control means for writing a scheduled message into said second memory location of said memory in response to reproduction of the start signal; and
    means for permitting the scheduled message to be written into said second memory location of said memory in response to reproduction of the start signal.

15. An electronic apparatus according to claim 14, wherein said memory includes means for magnetically storing the address information, the start signal and the message.

16. An electronic apparatus according to claim 14, further comprising a schedule memory for storing a time schedule in accordance with said address information.

17. An electronic apparatus according to claim 16, further comprising clock means for generating an output corresponding to the time of day.

18. An electronic apparatus according to claim 17, wherein said clock means is connected to said address generating means.

* * * * *